United States Patent
Araki et al.

(10) Patent No.: US 10,691,643 B2
(45) Date of Patent: Jun. 23, 2020

(54) DEDUPLICATION FOR FILES IN CLOUD COMPUTING STORAGE AND COMMUNICATION TOOLS

(71) Applicant: INTERNATIONAL BUSINESS MACHINES CORPORATION, Armonk, NY (US)

(72) Inventors: Hiroshi Araki, Yokohama (JP); Hiroyuki Miyoshi, Kawasaki (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 249 days.

(21) Appl. No.: 15/817,594

(22) Filed: Nov. 20, 2017

(65) Prior Publication Data

US 2019/0155920 A1    May 23, 2019

(51) Int. Cl.
  *G06F 7/00* (2006.01)
  *G06F 16/174* (2019.01)
  *H04L 12/58* (2006.01)
  *H04L 29/08* (2006.01)

(52) U.S. Cl.
  CPC .......... *G06F 16/1748* (2019.01); *H04L 51/08* (2013.01); *H04L 67/06* (2013.01); *H04L 67/1097* (2013.01)

(58) Field of Classification Search
  CPC ... G06F 3/0641; G06F 16/1748; G06F 16/215
  USPC ....................................................... 707/692
  See application file for complete search history.

(56) References Cited

U.S. PATENT DOCUMENTS

| 9,614,796 B2 | 4/2017 | Aleksandrov | |
| 2010/0332401 A1* | 12/2010 | Prahlad | G06F 3/0649 705/80 |
| 2014/0046911 A1* | 2/2014 | Roomp | H04L 51/08 707/692 |
| 2015/0365385 A1 | 12/2015 | Hore | |
| 2016/0134571 A1 | 5/2016 | Lindley et al. | |
| 2016/0241499 A1 | 8/2016 | Hailpern et al. | |
| 2018/0196609 A1* | 7/2018 | Niesen | G06F 3/0608 707/707 |

FOREIGN PATENT DOCUMENTS

| CN | 103108008 A | 5/2013 |
| CN | 106933872 A | 7/2017 |

OTHER PUBLICATIONS

"Slim down Microsoft Exchange," Netmail, https://www.netmail.com/software/detach (9 pages).

* cited by examiner

*Primary Examiner* — Alexandria Y Bromell
(74) *Attorney, Agent, or Firm* — Griffiths & Seaton PLLC

(57) ABSTRACT

A system and method for deduplication of a file in a communication message are presented. An attached file of a communication message may be determined to exist in a cloud storage system. A link may be sent to a communication client for accessing an identical file on the cloud storage system of the attached file.

17 Claims, 8 Drawing Sheets

DEDUPLICATION FOR FILES IN CLOUD COMPUTING STORAGE AND COMMUNICATION TOOLS

BACKGROUND OF THE INVENTION

Field of the Invention

The present invention relates in general to computing systems, and more particularly to, various embodiments for deduplication of a file in a communication message by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, the greater the need to make progress in these systems advantageous for efficiency, communication, and improvement in society.

SUMMARY OF THE INVENTION

Various embodiments for deduplication of files in a communication message using one or more processors are provided. In one embodiment, by way of example only, a method for deduplication of files in both cloud storages and communication tools, again by a processor, is provided. An attached file of a communication message may be determined to exist in a cloud storage system. A link may be sent to a communication client for accessing an identical file on the cloud storage system of the attached file.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
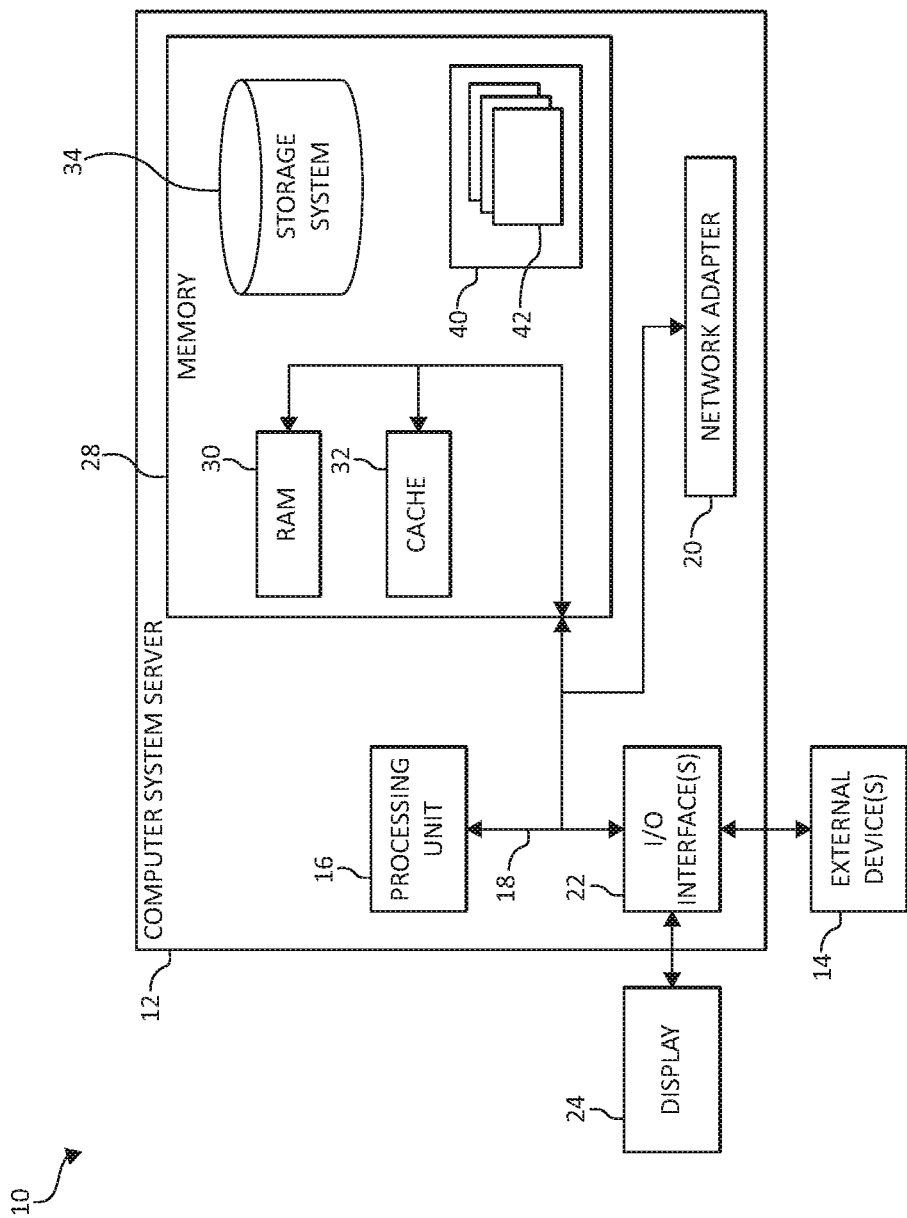
FIG. 1 is a block diagram depicting an exemplary computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement. Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

Many enterprises (e.g., companies, organizations, groups, government entities, etc.) possess in-house communication tools such as electronic mail or ("email"), online chat, instant messages, and the like. In addition, enterprises may deploy private cloud storage services for employees, such as, for example, using a service or communication tool that enables team members to share files such as, for example, using "Box," which is a cloud content management file sharing service.

For example, consider a user sending a file that presents in a cloud storage using the service or communication tool to a relevant person for his/her review via an email message. If the user attaches the file to the email message as an attached file, the same file becomes present in both the communication tool service and an email system. These files are often sent as attached files in the email. Having multiple copies of the same file may be challenging in the perspective of storage administrators because of unnecessary storage consumption. This incurs a cost to the enterprise and/or storage administrator while decreasing computing efficiency. However, this may not appear to be a problem in the perspective of users. For this reason, users are less likely to be motivated to make needed corrections. Moreover, if an email does not contain a file and a recipient to the email is required to log into a communication tool for retrieving the file, the recipient(s) incurs time, effort, and/or expense just to retrieve the fail. Also, a user may be required to have appropriate browse authority to open a link to access the file in the communication tool, thus added time is required to set access rights per file for sharing. These same challenges apply not only to file attachments to email messages, but also to file attachments to communication mediums and functionality such as, for example, online chat, wiki pages, and the like. That is, in these situations, exactly the same file is present in both a cloud storage system and a backend database (DB) of a communication tool such as, for example, an email system. For example, if each ten thousand users perform the above-described operation with a 10 megabyte ("MB") file once per month, duplicated files of 1164 gigabyte ("GB") are generated in one year.

If the cloud storage and the communication tools are on the same storage, duplicated data blocks may be deleted using existing deduplication technologies. However, cloud storage and communication tools are normally separated systems and files are stored in separate storage devices. Thus, existing deduplication technologies cannot be used.

Accordingly, the present invention provides a solution that eliminates duplicated capacity consumption when the same file exists in cloud storage and a separate communication tool. In one aspect, mechanisms of the illustrated embodiments provide for deduplication of files in both cloud storages and communication tools by one or more processors or computing systems. An attached file of a communication message may be determined to exist in a cloud storage system. A link may be sent to a communication client for accessing an identical file on the cloud storage system of the attached file.

For example, assume an enterprise uses both private cloud storage and communication tools such as, for example, an email system to share data/information between employees. A user may intend to share a file that is stored in cloud storage via email. As such, a user may provide a link (e.g., a Hypertext Transfer Protocol "HTTP" link) to the file stored in cloud storage so as to prevent additional storage space from being consumed. However, if the file is attached to the email, the present invention provides a solution that eliminates duplicated capacity consumption when the same file exists in cloud storage and a separate communication tool.

More specifically, when a file is uploaded to a cloud storage system, the cloud storage system may calculate a hash value for the file. When the file is attached to an email and is required to be sent, the communication tool (e.g., the email system, chat, wiki) calculates a hash value of the attached file. The email system may perform a look up operation for looking up a file that is in the cloud storage system and determine whether the same hash value of the file in the cloud storage system is identical to the hash value of the attached file by using an application programming interface ("API") that may be provided by the cloud storage system. If a same file is found, the email system may replace a link to the attached file with a link to the identical file in the cloud storage. Thus, a storage consumption for the attached file can be reduced.

In one aspect, the present invention may be applied to an email system as the communication tool. When considering a wiki system, "email" can be read as "wiki page", and "send an email message" as "save a wiki page."

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
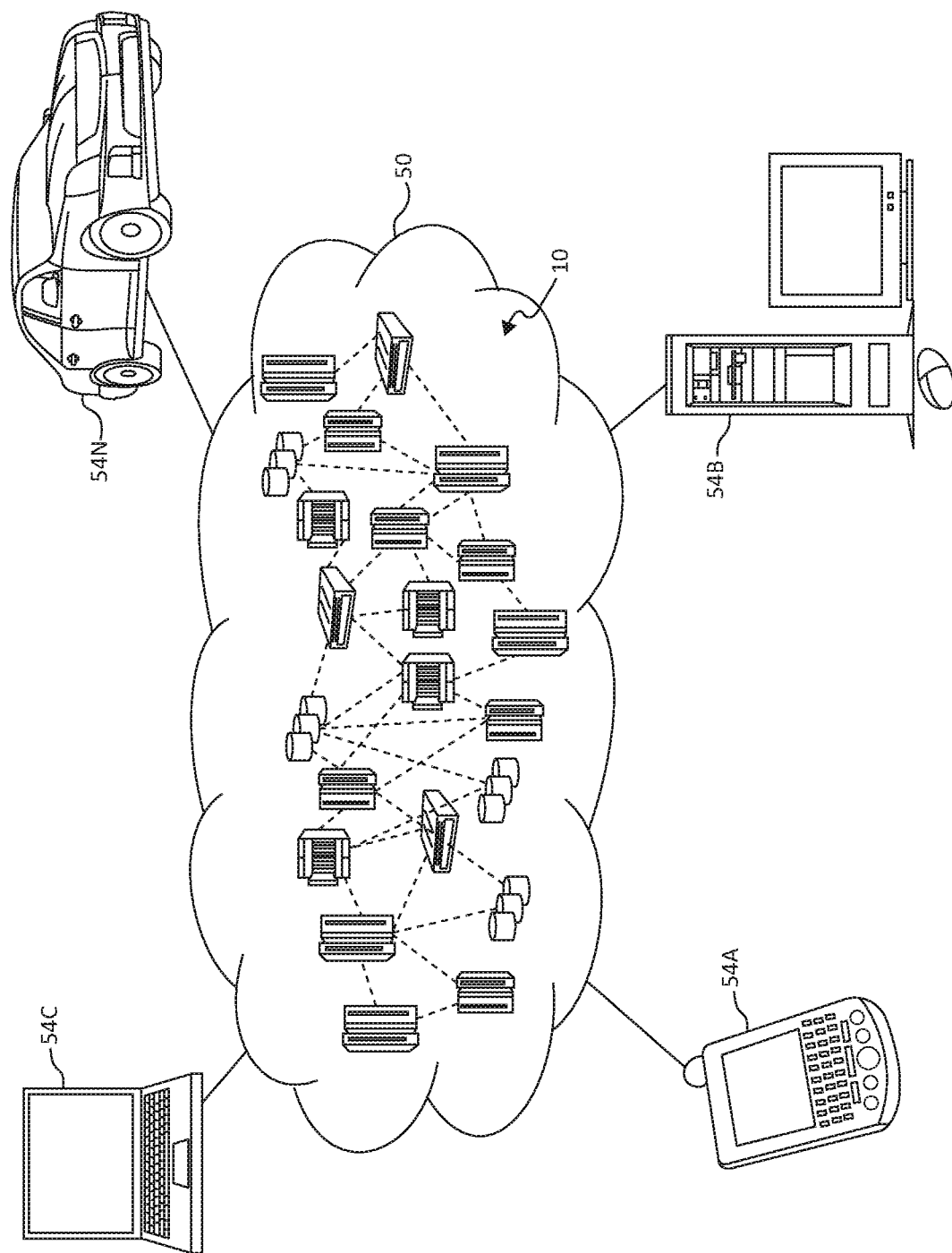
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
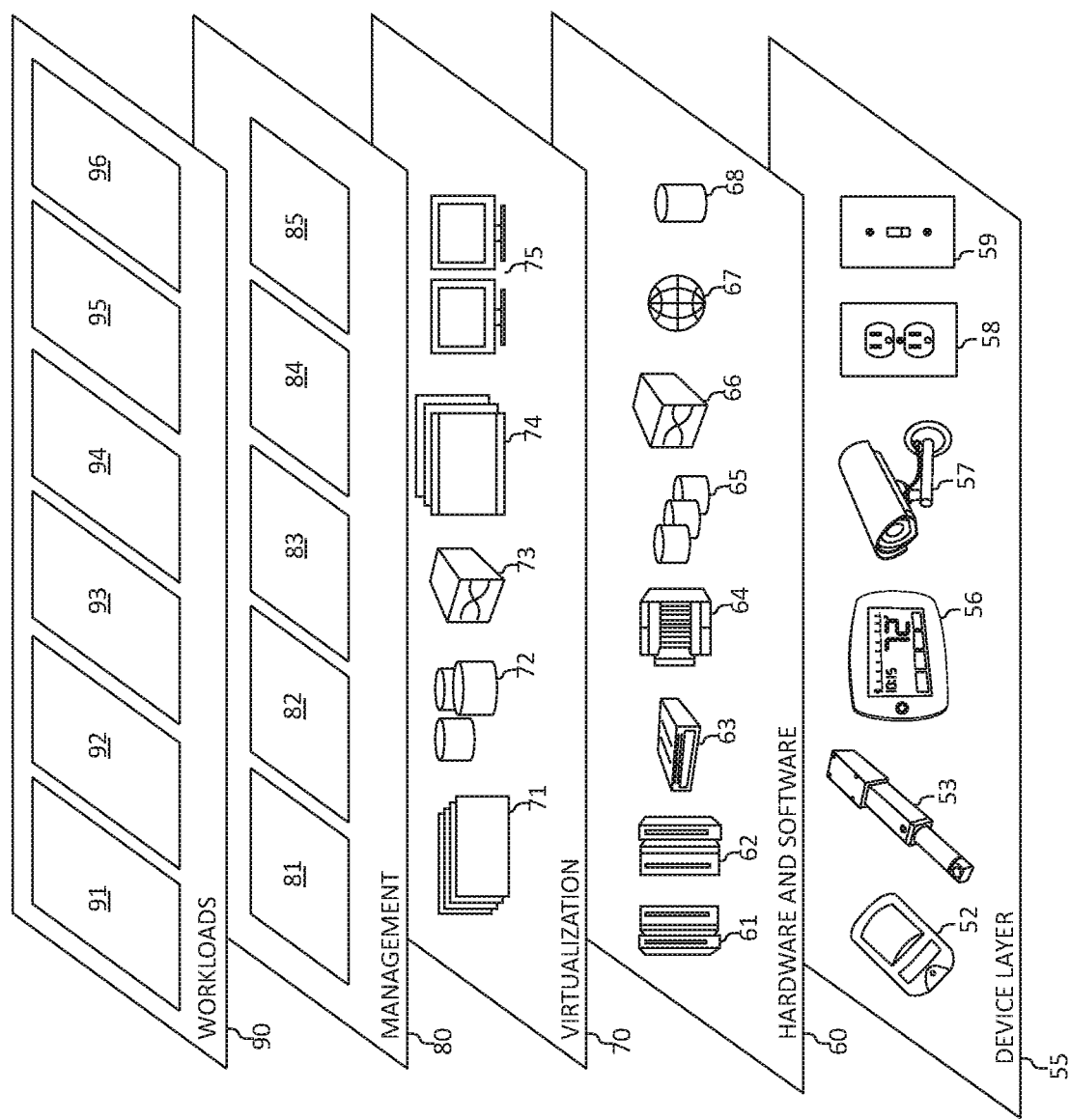
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various deduplication of files in a communication message workloads and functions 96. In addition, workloads and functions 96 for deduplication of files in a communication message may include such operations as data analytics, data analysis, and as will be further described, notification functionality. One of ordinary skill in the art will appreciate that the workloads and functions 96 for deduplication of files in a communication message may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for deduplication of files in a communication message. As a preliminary matter, the deduplication function realized by the present invention may not be implemented in a level of a file system, but rather implemented in an application level of the cloud storage system and communication tool system (e.g., an email system). In an additional aspect, the deduplication function realized by the present invention may be implemented in a level of a file system and at an application level of the cloud storage system and communication tool system. Specifically, the deduplication function may be implemented by adding functions to those two systems (e.g., the cloud storage system and communication tool system) and configuring those functions to communicate with each other via an API. The use of the API enables the implementation of the deduplication function so as to eliminate and/or reduce extensive integration of backend systems of the two applications. In this way, the mechanisms of the present invention may be applicable to existing systems of enterprises or organizations.

Figure 4:
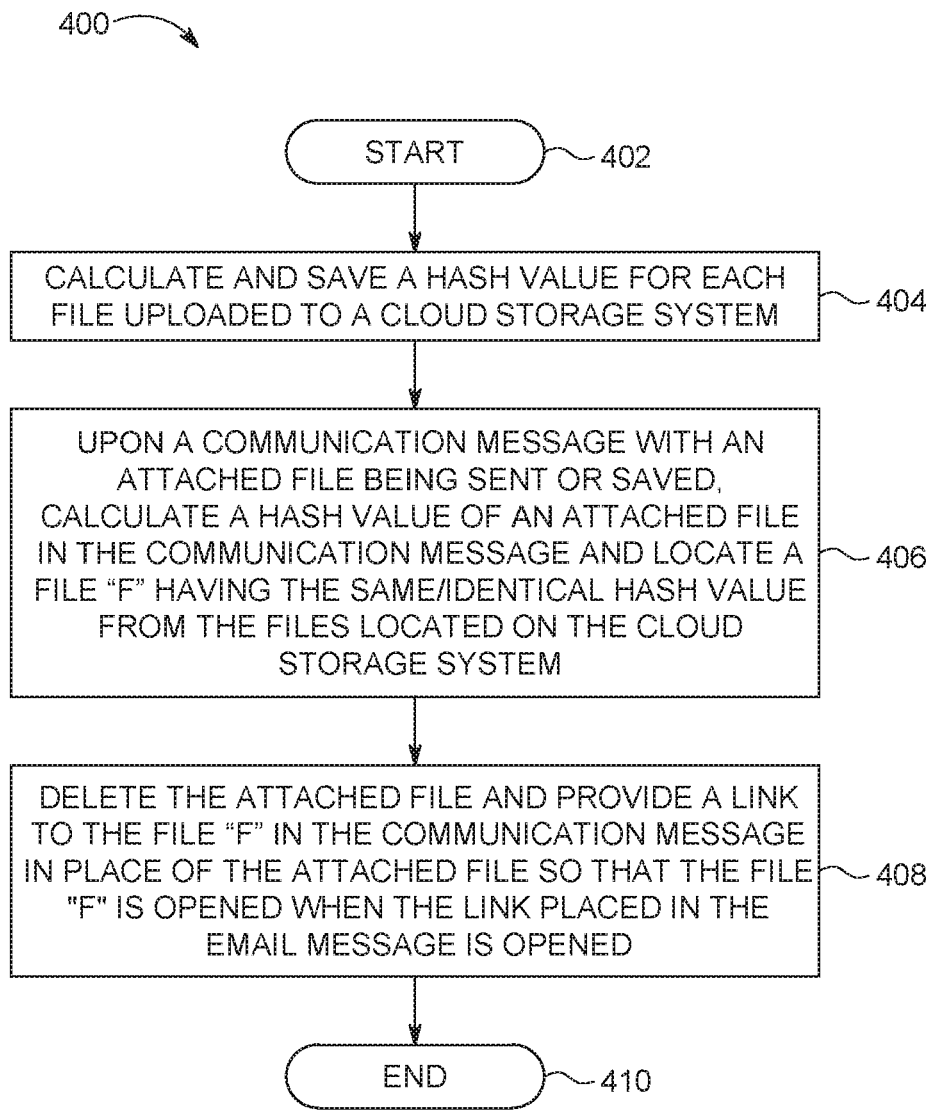
FIG. 4 is a flowchart diagram depicting an additional exemplary method for deduplication of files in a cloud storage system and a communication tool by a processor, again in which aspects of the present invention may be realized.

Turning now to FIG. 4, a method 400 for deduplication of a file in a communication message using a processor is depicted, in which various aspects of the illustrated embodiments may be implemented. The functionality 400 may be implemented as a method executed as instructions on a machine, where the instructions are included on at least one computer readable medium or one non-transitory machine-readable storage medium. The functionality 400 may start in block 402. A hash value (such as, for example "SHA256") may be calculated and saved for each file uploaded to a cloud storage system, as in block 404. Upon a communication message with an attached file being sent or saved, a hash value (e.g., SHA256) may be calculated of an attached file in a communication message (e.g., an email message) that is sent and/or saved, and a file "F" having the same/identical hash value (e.g., SHA256) may be located from the files located on the cloud storage system, as in block 406. The attached file may be deleted (from the communication message) and a link may be provided to the file "F" in the communication message in place of the attached file so that the file "F" may be opened when the link placed in the communication message is opened, as in block 408. The functionality 400 may end, as in block 410.

Figure 5:
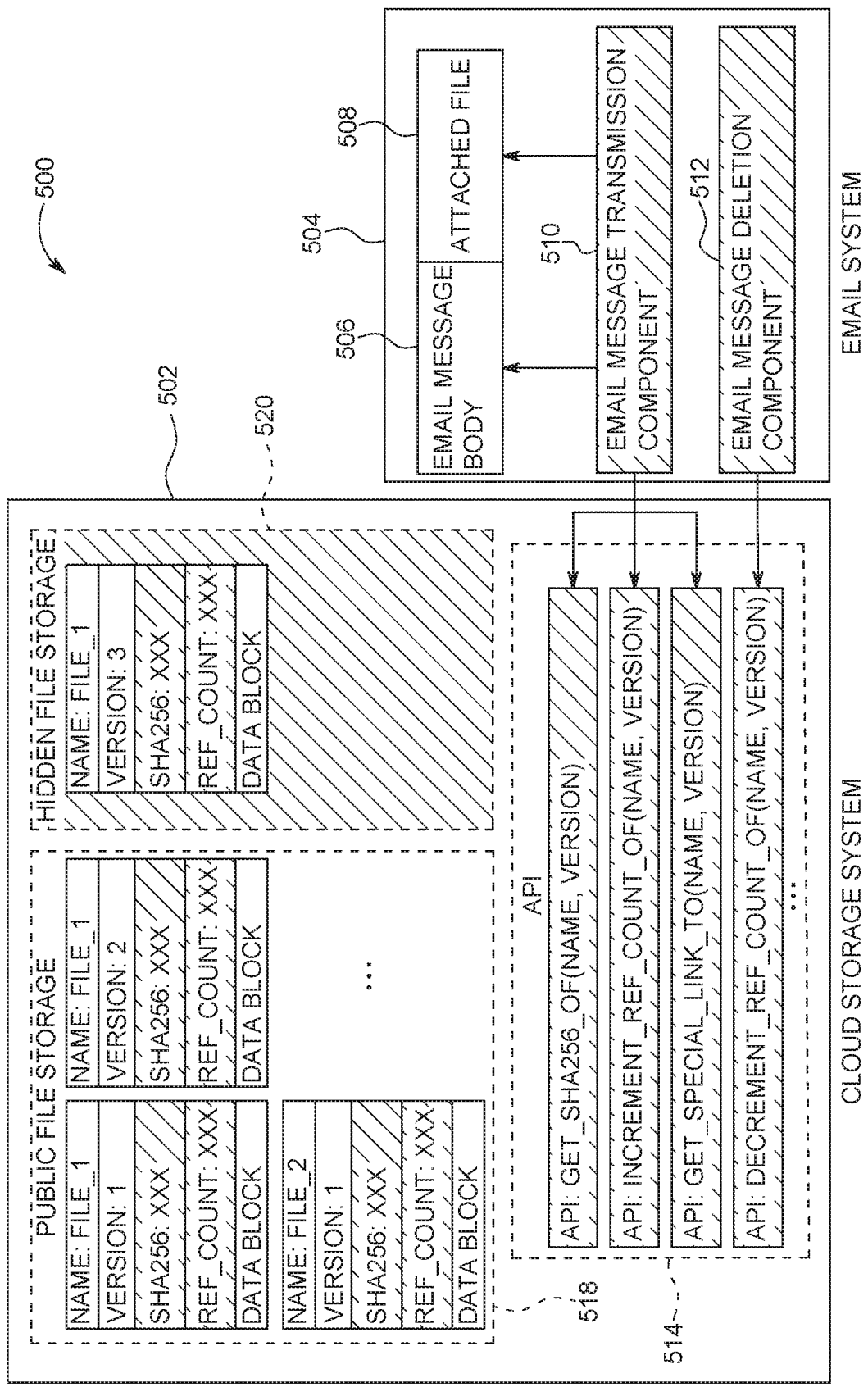
FIG. 5 is an additional block diagram depicting an exemplary functional relationship between various aspects of the present invention.

Turning now to FIG. 5, a schematic diagram depicting a deduplication system 500 for deduplicating files in a cloud storage system and a communication tool is depicted. As will be seen, many of the functional blocks may also be considered "modules" of functionality, in the same descriptive sense as has been previously described in FIGS. 1-3. Many of the functional blocks 500 may execute as background processes on various components, either in distributed computing components, or on the user device, or elsewhere, and generally unaware to the user performing generalized tasks of the present invention. Moreover, the operations of functionality 400 of FIG. 4 may be implemented in the various blocks of functionality of FIG. 5. Also, one or more aspects of FIGS. 1-3 may also be included with and/or implemented with FIG. 4.

The deduplication system 500 may include a cloud storage system 502 and an email system 504. The cloud storage system 502 may include a public file storage system 518, a hidden (e.g., non-public) file storage system 520, and one or more APIs 514.

The email system 504 may include an email message 506 (e.g., an email message body) that may have an attached file(s) 508 attached to the email message 506. The email system 504 may include an email message transmission component 510 and an email message deletion component 512. In operation, the email message transmission component 510 and/or the email message deletion component 512 may communicate, transmit, and/or send or receive the email message body 506 and/or the attached file 508 to the cloud storage system 502 via one or more of the APIs 514.

As a preliminary matter, in the email system 504, the attached file(s) 508 in an email message are not embedded in the email message body 506 as binary data, but may be downloaded via an HTTP after receipt of the email message body 506. In one aspect, the email system may include a variety of email system types.

File Storage Area of the Cloud Storage System

In the cloud storage system 502, the hidden file storage system 520 may be provided separately from other systems and storages. The public file storage system 518 may be a storage system where uploaded files are saved. Generally, each file has one or more attributes such as, for example, name and size, and in addition, has version information in the cloud storage system 502. Unlike the public file storage system 518, files stored in the hidden file storage system 520 are not generally accessible from users of the cloud storage. Rather, the public file storage system 518 stores files which are linked from email messages.

Cloud Storage System API

In the one or more of the APIs 514, one or more API functions may be implemented. For example, the following four API functions may be implemented. 1) A "get_sha256_of (name, version)" function that may return a hash value (e.g., a SHA256 value) of a file specified by the name and version parameters. The execution time for the API function is "O(1)" (e.g., a constant time such as, for example 14 nanoseconds or three minutes, may be required no matter the amount of data in the set) because the SHA256 value has already been calculated. 2) A "increment_ref_count_of(name, version)" function that increments the "ref_count" (e.g., reference count which means the number of emails that refers, attaches, and/or includes a target file) of the file specified by the name and version parameters. 3) A "get_special_link_to(name, version)" API function that creates and returns an HTTP link that allows access to the file specified by the name and version parameters without authentication. 4) A "decrement_ref_count_of(name, version)" function that decrements the "ref_count" of the file specified by the name and version parameters. If the ref_count becomes 0, the function may delete the specified file.

Upload of a File to a Cloud Storage System

When a file is uploaded to the cloud storage system 502, the cloud storage system 502 may perform the following in addition to any existing processing. The cloud storage system 502 may calculate the hash value (e.g., the SHA256 value) of the uploaded file, and save the value as metadata sha256. The cloud storage system 502 may initialize the metadata "ref_count" with 0. The file for which upload processing has been completed may be saved in the public file storage system 518 of the cloud storage system 502.

Transmission of an Email Message with the Same File as the Uploaded File as Attachment Upon activation of a send button, the email message transmission component 510 may operate as follows. Step 1) The email message transmission component 510 may determine and/or calculate a hash value (e.g., the SHA256 value) of the attached file(s) 508, which the SHA256 value may be hereinafter denoted as "S". Step 2) The email message transmission component 510 may send the email message (e.g., the email message body 506 and the attached file(s) 508). Step 3) The email message transmission component 510 may create and/or make a list of files, folders, and containers in/on a communication tool in which the attached file(s) 508 may be stored. If all the files in/on the communication tool are to be searched, it is possible that comparison of hash values result in a conflict. Thus, the files to be searched may be narrowed down to a defined degree or narrowed search query. For example, a search may be conducted by: a) listing files uploaded by a user who has created the email message (which may include the email message body 506 and/or the attached file(s) 508) and/or b) restricting a search to only recently uploaded files (e.g., recently uploaded within a defined time period or range of time periods. Step 4) For each file "F" and version "V" of all the combinations of files and versions listed in step 3, the email message transmission component 510 may a) call one or more of the APIs 514 (e.g., a cloud storage API function get_sha256_of(F, V)) and this API call may return the value of metadata sha256 of the version V of file F and hereinafter, the result value may be denoted as "s1". Also, the email message transmission component 510 may b) if s1==S, i) call the one or more of the APIs 514 (e.g., call the cloud storage API function increment_ref_count_of(F, V)), ii) call the Cloud storage API function get_special_link_to(F, V), the result value of which is hereinafter denoted as slink(*), iii) delete the attached file(s) 508 from the sent email message and instead insert a section link ("slink") therein, and iv) finishes the computing operations.

In one aspect, transmission of the email message (which may include the email message body 506 and/or the attached file(s) 508) may be performed after step 4. However, the current listed order of the steps is recommended so as to enable the email transmission and searching for a duplicated file to be asynchronously performed, which facilitates increasing the number of files to be searched in step 3. Thus, the provided order of steps for transmission of an email message with the same file as the uploaded file as attachment increases the opportunities and percentage chances of finding a duplicated file. Furthermore, the timing of the deduplication operation may be disadvantageously delayed. However, it is considered that the amount of file capacity consumption that can be reduced by a deduplication operation for an individual attached file should not be so large.

In an additional and supplementary aspect of step 4-b-ii, the file "F" may be recognized as a duplicated file and may been uploaded to the cloud storage (e.g., publically accessible). As such, some access restrictions may be required and imposed on the file "F." For this reason, a private link (e.g., a link to which no access right is set and everybody can have access) may be used as the slink so as to enable the recipients of the email message the ability to access the file. Also, for increasing computing security, the cloud storage system 502 may be configured to have a new API function (e.g., API function add permission (file, version, email-address)), which gives access rights to the file to a user associated with the email address parameter, and recipients of the email message are given a permission to access the file using the new API function.

The foregoing descriptions have illustrated how a deduplication operation is performed. In lieu of the forgoing, following provides the behavior of the present invention when an operation is made to a linked file on the cloud storage or an email message containing a slink.

Deletion of a File from Cloud Storage

When a version of a file (e.g., File_1 version: 1, File_1 version: 2, and/or File_2 version: 1) is deleted from the cloud storage system 502, if ref_count>0 and the file is deleted, the file may become inaccessible from email messages. Accordingly, the present invention may place the file of the cloud storage system 502 in the following states: State 1) the file is not accessible from the normal interface of the cloud storage (the file is created to be fake and may be deleted), and/or State 2) the file is accessible only via a selected HTTP link. As such, the hidden file storage system 520 may be introduced/provided as a folder/container having such characteristics to enable the placing of the file in the State 1 and/or State 2. The hidden file storage system 520 may be provided by 1) preparing a folder which any user of the cloud storage is prohibited from accessing and 2) registering each selected or identified user of the email system 504 as the only users who can access the folder (e.g., the hidden file storage system 520). Deleting a version of a file from the cloud storage system 502 (e.g. from the public file storage system 518) may be performed as follows. Also, if the reference count equals zero (e.g., "ref_count==0,") then the file may be deleted using one or more deletion operations, and/or the file may be moved from the public file storage system 518 to the hidden file storage system 520.

Deletion of an Email Message Containing Slink

When an email message containing a slink is deleted, and if, the file linked from the slink is present in the hidden file storage system 520 and the email message is the only one that refers to the file, the file is to be deleted from the cloud storage system 502 (e.g. from the hidden file storage system 520). That is, when an email message containing a slink is deleted, the email message transmission component 510 operates as follows. Step 1) Retrieve the name F and version V of a file to which the slink is linked. As a first step ("step 1"), the slink may be formatted such that the name and version of the linked file may be directly recognizable from the slink, and/or other API function of the one or more API functions 514 may be implemented such as, for example, get_filename_and_version_of(slink). As a second step ("step 2"), the email message transmission component 510 may call one or more of the APIs 514 (e.g., call cloud storage API decrement_ref_count_of(F, V)). Again, as previously described, the "cloud storage API decrement_ref_count_of (F, V)" API call may decrement the reference count "ref_count," and when the reference count "ref_count" reaches 0, the file may be deleted from the cloud storage system 502. As a third step ("step 3"), the email message transmission component 510 may delete the email message.

It should be noted that as described herein for the present invention, when a file is first uploaded on the cloud storage system (e.g., the cloud storage system 502) and then used in an email message as an attached file (e.g., attached file(s) 508), a deduplication operation of the file is possible. However, when a file is first attached to an email message as an attachment and then uploaded to the cloud storage system (e.g., the cloud storage system 502), the deduplication operation is not allowed/possible. However, uploading to the cloud storage system (e.g., the cloud storage system 502) may be performed at an earlier time period, which is likely to occur when the cloud storage is synchronized with a local file system.

Figure 6:
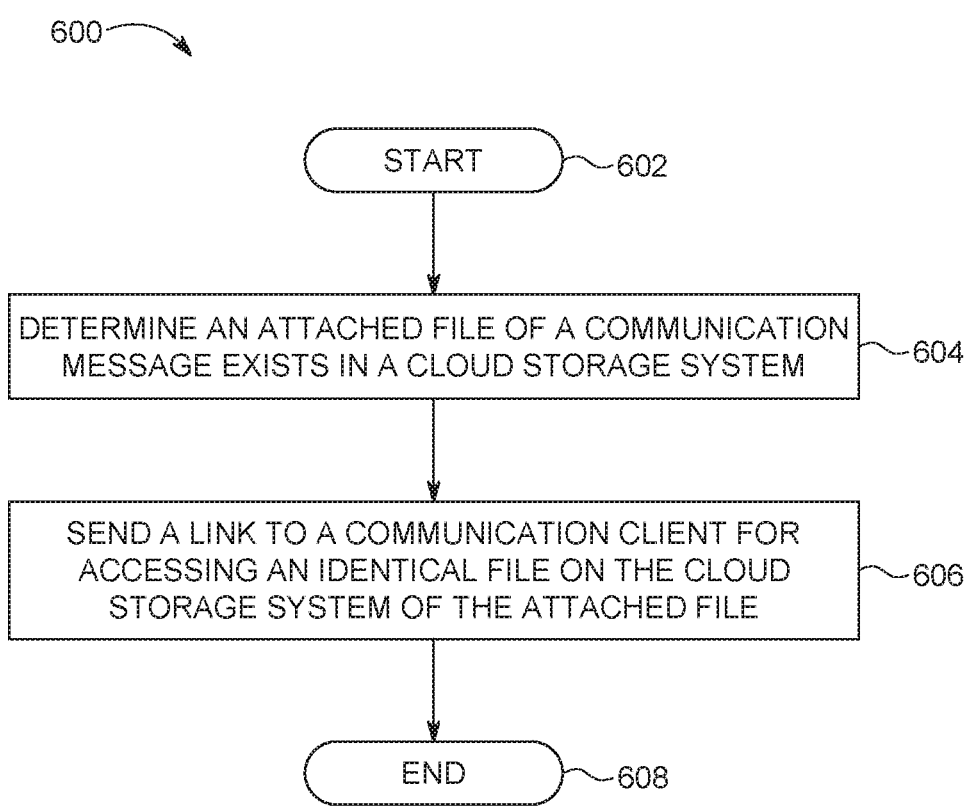
FIG. 6 is a flowchart diagram depicting an additional exemplary method for deduplication of files in a cloud storage system and a communication tool by a processor, again in which aspects of the present invention may be realized.

Turning now to FIG. 6, a method 600 for deduplication by a cloud storage server using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 6.

The functionality 600 may start in block 602. A determination operation may be performed for determining an attached file of a communication message (e.g., an email) exists in a cloud storage system, as in block 604. A link may be sent to a communication client (e.g., an email client recipient) for accessing an identical file on the cloud storage system of the attached file, as in block 606. The functionality 600 may end, as in block 608.

In one aspect, in conjunction with and/or as part of at least one block of FIG. 6, the operations of method 600 may include each of the following. The operations of method 600 may send and/or receive the communication message having the attached file from the communication client. The operations of method 600 may determine the attached file exists in the cloud storage system using the cloud storage server or the communication client, wherein the communication client is an email client. A list of files uploaded from a sender of the communication message may be searched.

In an additional aspect, the operations of method 600 may obtain a hash value of the identical file via the communication client using an application programming interface (API) call, compare the hash value of the identical file to the hash value in the attached file in the communication message; and/or determine the identical file in the cloud storage system has a hash value identical to the attached file in the communication message. Also, the identical file may be relocated to a selected area of the cloud storage system only accessible via the link upon deletion of the identical file.

Figure 7:
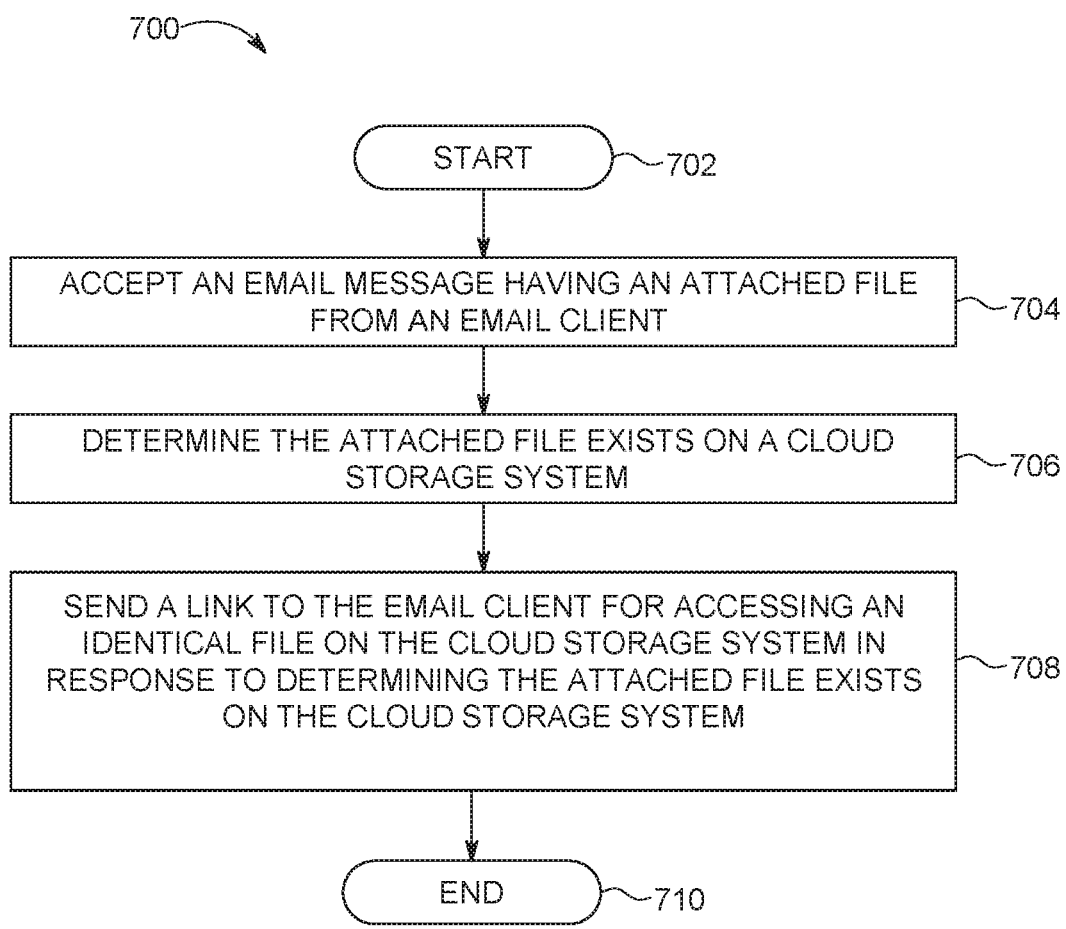
FIG. 7 is a flowchart diagram depicting an additional exemplary method for deduplication of a file by a cloud storage server by a processor, again in which aspects of the present invention may be realized.

Turning now to FIG. 7, a method 700 for deduplication by a cloud storage server using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 7.

The functionality 700 may start in block 702. An email message having an attached file may be accepted, by the cloud computing server, from an email client, as in block 704. A determination operation may be performed, by the cloud computing server, for determining the attached file exists on a cloud storage system, as in block 706. In response to determining the attached file exists on the cloud storage system, a link may be sent, by a cloud storage server, to the email client for accessing an identical file on the cloud storage system, as in block 708. The functionality 700 may end, as in block 710.

Figure 8:
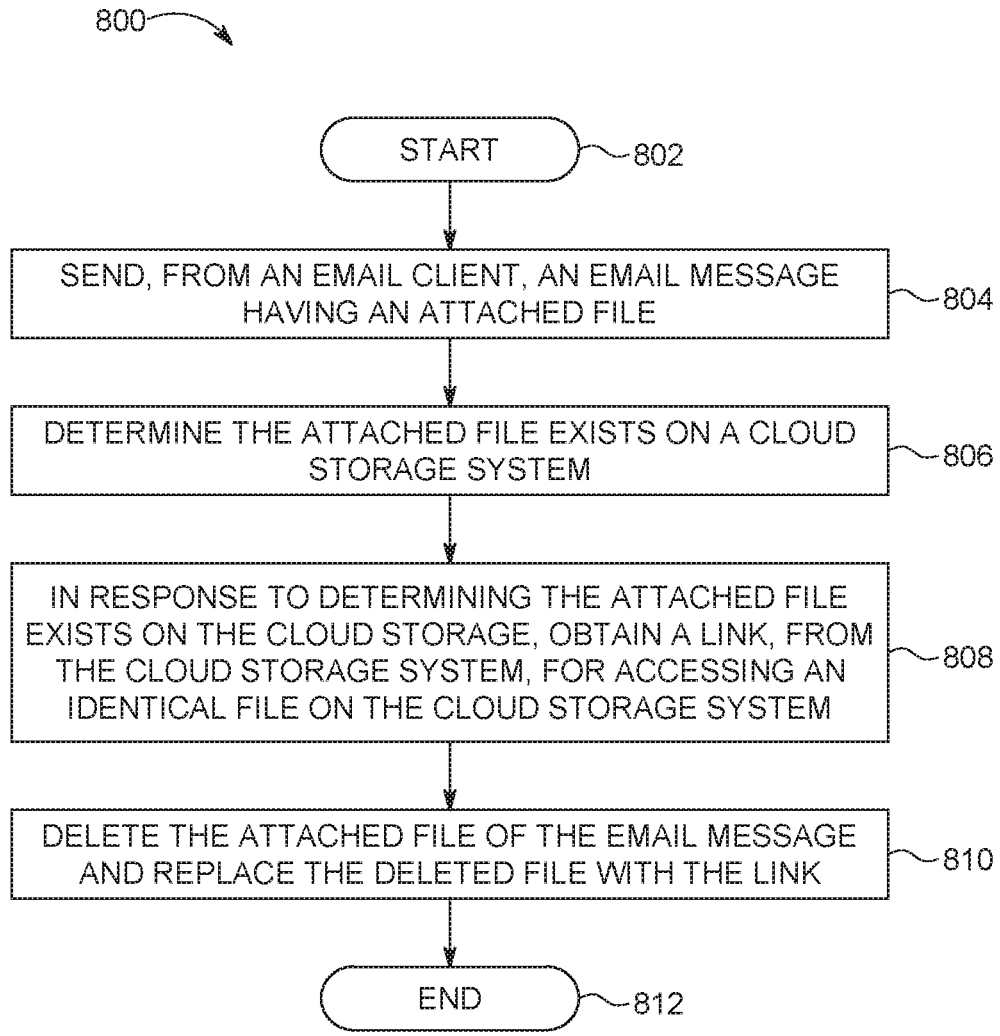
FIG. 8 is a flowchart diagram depicting an additional exemplary method for deduplication of a file by an email client by a processor, again in which aspects of the present invention may be realized.

Turning now to FIG. 8, a method 800 for deduplication by an email client using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 8.

The functionality 800 may start in block 802. An email message having an attached file may be sent from an email client, as in block 804. A determination operation may be performed for determining the attached file exists on a cloud storage system, as in block 806. In response to determining the attached file exists on the cloud storage, a link may be obtained, from the cloud storage system, for accessing an identical file on the cloud storage system, as in block 808. The attached file of the email message may be deleted and the deleted file may be replaced with the link, as in block 810. The functionality 800 may end, as in block 812.

In one aspect, in conjunction with and/or as part of at least one blocks of FIGS. 6-8, the operations of methods 600, 700, and/or 800 may include each of the following. The operations of methods 600, 700, and/or 800 may determine whether a file on the cloud storage has a hash value identical to a hash value of the attached file for determining whether the attached file exists on the cloud storage system. A hash value of a file stored on the cloud storage may be obtained by an email client by using one or more API calls (e.g., "get_sha256"). A comparison operation may be performed between a hash value in the cloud storage and a hash value of the attached file so as to determine/verify if the files are same and/or identical. In order to determine whether the attached file exists on the cloud storage, a search may be performed and/or conducted on a list including files uploaded by a sender of an email message and/or performed and/or conducted on a list including files recently uploaded (e.g., within a selected or defined time period) by the sender of the email message.

In one aspect, the operations of methods 600, 700, and/or 800 may provide a link to the file on the cloud storage that may be accessible from any user of the email system and/or cloud storage system. In an additional aspect, when a file on the cloud storage is deleted, the deleted file may be removed to an area on the cloud storage (hidden file area) and accessible only through a selected link, which may be restricted to selected or identified users of the email system and/or cloud storage system. An email client may obtain the link, from the cloud storage, by using one or more API calls (e.g., "get_special_link" API call function).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for deduplication of a file in a communication message by a processor, comprising:
   determining, upon sending a communication message from a sender, that an attached file of the communication message exists in a cloud storage system; and
   sending a link to a communication client of a receiver of the communication message for accessing an identical file on the cloud storage system of the attached file:
   wherein the attached file is deleted from the communication message and replaced with the link prior to the receiver receiving the communication message,
   wherein relocating the identical file to a selected area of the cloud storage system only accessible via the link upon deletion of the identical file.

2. The method of claim 1, further including sending or receiving the communication message having the attached file from the communication client.

3. The method of claim 1, further including determining the attached file exists in the cloud storage system using the cloud storage server or the communication client, wherein the communication client is an email client.

4. The method of claim 1, further including:
   obtaining a hash value of the identical file via the communication client using an application programming interface (API) call; and
   comparing the hash value of the identical file to the hash value in the attached file in the communication message.

5. The method of claim 1, further including determining the identical file in the cloud storage system has a hash value identical to the attached file in the communication message.

6. The method of claim 1, further including searching a list of files uploaded from a sender of the communication message.

7. A system for deduplication of a file in a communication message, comprising:
   one or more computers with executable instructions that when executed cause the system to:
   determine, upon sending a communication message from a sender, that an attached file of the communication message exists in a cloud storage system; and send a link to a communication client of a receiver of the communication message for accessing an identical file on the cloud storage system of the attached file:

wherein the attached file is deleted from the communication message and replaced with the link prior to the receiver receiving the communication message, wherein relocating the identical file to a selected area of the cloud storage system only accessible via the link upon deletion of the identical file.

8. The system of claim 7, wherein the executable instructions further send or receive the communication message having the attached file from the communication client.

9. The system of claim 7, wherein the executable instructions further determine the attached file exists in the cloud storage system using the cloud storage server or the communication client, wherein the communication client is an email client.

10. The system of claim 7, wherein the executable instructions further:

obtain a hash value of the identical file via the communication client using an application programming interface (API) call; and compare the hash value of the identical file to the hash value in the attached file in the communication message.

11. The system of claim 7, wherein the executable instructions further determine the identical file in the cloud storage system has a hash value identical to the attached file in the communication message.

12. The system of claim 7, wherein the executable instructions further search a list of files uploaded from a sender of the communication message.

13. A computer program product for, by a processor, deduplication of a file in a communication message, the computer program product comprising a non-transitory computer-readable storage medium having computer-readable program code portions stored therein, the computer-readable program code portions comprising:

an executable portion that determines, upon sending a communication message from a sender, that an attached file of the communication message exists in a cloud storage system; and an executable portion that sends a link to a communication client of a receiver of the communication message for accessing an identical file on the cloud storage system of the attached file:

wherein the attached file is deleted from the communication message and replaced with the link prior to the receiver receiving the communication message, wherein relocating the identical file to a selected area of the cloud storage system only accessible via the link upon deletion of the identical file.

14. The computer program product of claim 13, further including an executable portion that sends or receives the communication message having the attached file from the communication client.

15. The computer program product of claim 13, further including an executable portion that determines the attached file exists in the cloud storage system using the cloud storage server or the communication client, wherein the communication client is an email client.

16. The computer program product of claim 13, further including an executable portion that:

obtains a hash value of the identical file via the communication client using an application programming interface (API) call;

compares the hash value of the identical file to the hash value in the attached file in the communication message; and determines the identical file in the cloud storage system has the hash value identical to the attached file in the communication message.

17. The computer program product of claim 13, further including an executable portion that searches a list of files uploaded from a sender of the communication message.

* * * * *